No. 645,013. Patented Mar. 6, 1900.
W. B. & L. C. REED.
SERIES ARC SYSTEM OF ELECTRICAL DISTRIBUTION.
(Application filed Sept. 15, 1899.)

(No Model.)

Witnesses.
Robert Everitt.

Inventors,
Warren B. Reed.
Lyman C. Reed.
By James L. Norris
Atty.

UNITED STATES PATENT OFFICE.

WARREN B. REED AND LYMAN C. REED, OF NEW ORLEANS, LOUISIANA.

SERIES-ARC SYSTEM OF ELECTRICAL DISTRIBUTION.

SPECIFICATION forming part of Letters Patent No. 645,013, dated March 6, 1900.

Application filed September 15, 1899. Serial No. 730,622. (No model.)

*To all whom it may concern:*

Be it known that we, WARREN B. REED and LYMAN C. REED, citizens of the United States, residing at New Orleans, in the parish of Orleans and State of Louisiana, have invented new and useful Improvements in Series-Arc Systems of Electrical Distribution, of which the following is a specification.

In the present system of series-arc distribution of electrical energy, of which the ordinary high-tension arc-light distribution may be taken as a type, the current is usually constant, and of a potential which varies according to the number of lamps in series on the circuit. In practice this potential of the current runs as high in some instances as six or seven thousand volts and the wires are insulated and supported usually on poles which may carry currents of other potentials. Any cross between these wires and wires utilized for low-tension house distribution results in the introduction into the house-wiring of the high-tension arc current. As at present installed every point of the system, whether on the outgoing wire, the return-wire, or the closed circuit, is of the same difference of potential from the earth as the current at the brushes of the generator, provided there are no grounds on the system. Should any one come in contact, therefore, with these high-tension wires it would result in the immediate discharge of the high-tension current through the ground furnished.

By our system, which is an improvement upon the foregoing, we overcome and avoid the danger above noted, due to extending high-tension circuits through the streets of a city, and effect a reduction at every translating device of the difference of potential between the conductors of the circuit.

The details of the invention will be fully described hereinafter and what we regard as new will be set forth in the claims.

Figure 1:
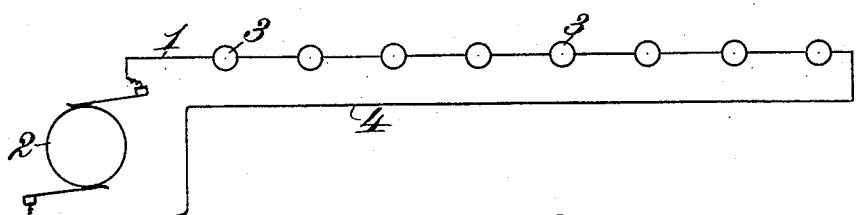
Figure 2:
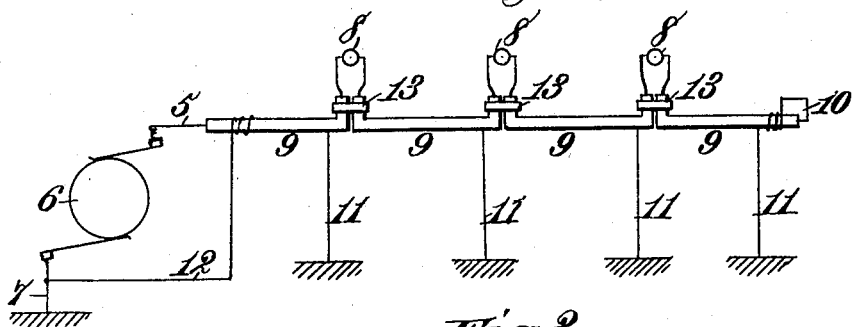

In the drawings forming part of this specification, Figure 1 is a diagrammatic view illustrative of the present system of overhead series-arc distribution. Fig. 2 is a similar view of our improved system; and Fig. 3 is a detail view, on an enlarged scale, showing the circuit connections of one of the translating devices.

Like reference-numerals indicate like parts in the different views.

In Fig. 1 the outgoing wire 1 leads from the generator 2 to the translating devices 3 3, which are in series with each other, and the return-wire 4 leads from the end of the distribution to the other side of said generator. In Fig. 2 the conductor 5 leads from one brush of the generator 6, the other brush of which is grounded through wire 7. The translating devices 8 8 are in series with the conductor 5, and said conductor is inclosed by and insulated from a metallic covering 9 throughout its length. At the end of the distribution the interior conductor 5 is connected with its metallic covering through a wire 10. The said covering is grounded at every available point throughout the system, as shown at 11 11, and is also connected through the wire 12 with the ground-wire 7, leading from one brush of the generator 6. In order that the translating devices 8 may be conveniently connected with the interior conductor 5, the metallic covering 9 is made in sections and the adjacent ends of said sections are electrically bonded together, as shown at 13, so as to form a continuous casing for said interior conductor. This casing or covering, bonded and grounded as shown, constitutes the return-conductor of the system. The two sides of the circuit are preferably formed by a metallic sheathed cable, in which the interior wire is the outgoing conductor of the circuit and the metallic sheathing is the return-conductor.

Figure 3:
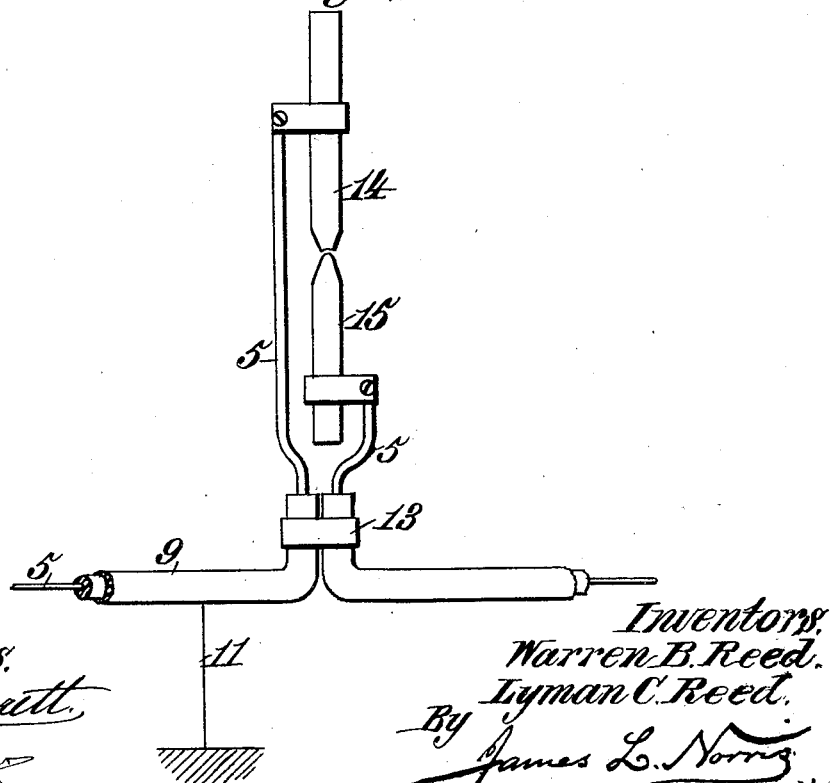

In Fig. 3 the connection between one of the translating devices and the interior conductor 5 is clearly represented, and it will be observed that the two carbons 14 and 15 form a part of the inner conductor.

From the foregoing description it will be seen that in our improved system we permanently ground one brush of the generator at the source of supply and also ground the sheathing or exterior covering of the cable at every available point of the entire system. In this way we obtain at the generator a difference of potential to be used on the circuit which between the interior conductor and the exterior casing at the source of supply is equal to the fall of potential across the translating devices. For example, in a circuit where the initial potential at the generator is one thousand volts the potential between the interior conductor and the exterior casing is one thousand volts. If there are twenty lamps on this circuit with a fall of potential at each lamp of fifty volts, then the difference of potential between the interior conductor and the exterior casing will decrease at each translating device by fifty volts. At the end of the circuit there will only be the difference of potential of the last lamp between the interior conductor and the exterior casing. It will also be seen that the grounding at every available point of the exterior casing makes the potential of said casing and the earth one and the same. In other words, since the exterior casing is grounded at many points it may be considered as a part of the earth itself which is folded around the interior conductor and insulated therefrom, and any leakage between the interior conductor and the exterior casing can in no way affect the potential of the exterior casing or the earth. By utilizing this grounded exterior casing surrounding the interior conductor of the circuit we absolutely prevent any other current which comes in contact with the exterior casing from reaching the interior conductor.

Where the system is fed from a series-arc generator or a constant-current machine, a cross between the interior conductor and the exterior casing or a short circuit in the cable will operate the automatic regulating device of the generator and said generator will immediately adapt itself to the new circuit of reduced resistance. In other words, should the short circuit occur within the cable it would result simply in cutting out the lamps beyond the point where the short circuit occurred and would not in any way affect the burning of the lamps between the short circuit and the generator. This is of great advantage in locating trouble which might develop on the circuit itself, as it is evident that any trouble which occurred must be between the last light which burns on the circuit and the light beyond. In the present systems where grounds occur on the overhead wires or on the underground cables it is with great difficulty that they can be located. The finding of them necessitates testing the wire between different points of the system, and even this method is extremely unsatisfactory on account of the fact that when the circuit is not in action the grounds which previously existed often have such a high resistance that their detection is prevented. Furthermore, in the present overhead system of series arc distribution, particularly that adapted to street-lighting, where the wires of necessity have to run through trees, the deterioration of the insulation of the circuit is extremely great, and in bad weather, when the insulation becomes saturated and often becomes abraded by the swinging of the wires, it is almost impossible to obtain a proper service, and the leakage of these high-tension currents to earth frequently results in fires and loss of life. Where only one conductor is employed, however, which is at a difference of potential from the earth, decreasing in direct ratio to the number of translating devices interposed and where this conductor is surrounded by an insulation of high resistance which is protected from abrasion, moisture, and actual contact with deteriorating influences by a metallic casing which entirely surrounds and protects it, we overcome all the dangers and disadvantages of the present overhead high-tension series arc distribution. As the current carried by a series arc distribution varies in practice from five to ten amperes, according to the translating device used, the exterior casing of the cable employed must necessarily have a carrying capacity as large as or larger than the interior conductor; but this exterior casing is amply sufficient to carry this return-current of the circuit, even if it be insulated at all points from the earth. However, in our system, where we ground the exterior casing at every available point, we place the carrying capacity of the earth in parallel with this conductor. The resistance of the return-conductor, therefore, need not be considered.

In an ordinary ground return-circuit, where there is a ground at the generator, another ground at the end of an overhead conductor, and the earth is utilized as the return-conductor to carry the current between these grounds, the overhead conductor is at all points at a difference of potential with the earth, varying with the distance from the source of supply. The overhead conductor is not in any way protected from crossing wires or from the evils of the present return-wire circuit where two separate conductors are employed. Besides, a grounding of the circuit at two points does not insure a return of effective working resistance, for the reason that the grounds at the generator and at the end of the circuit have a certain resistance, which varies with the conditions of the soil, &c. In our system we do not utilize the earth as a return except incidentally. The grounding of the outer metallic casing of the conductor is for the purpose of making its potential the same at all points of the system, and the fact that the earth is placed in parallel at every available point by the grounding of this casing simply tends to make our system more effective by lowering the resistance of the return-conductor. The successful operation of our system, therefore, so far as the carrying capacity of the conductors is concerned, is in no way dependent upon the earth.

In the present overhead system the wires are supposed to be insulated from the earth. As a matter of fact, even when these systems are not grounded so heavily as to prevent the burning of the lamps, small leakages occur at every insulator and wherever the wires pass through trees or come in contact with other circuits to the earth. All of these many small grounds, when taken in multiple, form a ground of low resistance, and contact with one of the wires may be fatal. Hundreds of lives have been lost in this way and much loss of property has been incurred. Furthermore, when the lamps are being trimmed and there is supposed to be no current upon these circuits a cross with another wire carrying a current of high potential will cause the high-potential current to be upon these circuits, and great numbers of accidents to life have occurred to workmen from this cause.

In our system, where we have the interior conductor insulated from and surrounded by a metallic sheath which is of the same potential under all circumstances as the earth itself, it is impossible, even should the cable break and fall to the earth, for any dangerous current to come in contact with any one handling the cable unless the interior conductor is touched, and when the lamps in our system are to be trimmed the operator can be absolutely assured that no foreign high-tension current can exist on the circuit, from the fact that the interior conductor is protected at all points except in the lamp itself and that the exterior casing which might come in contact with high-tension currents is necessarily of the same potential as the earth itself. Our system, therefore, can never become a menace to life, and its adoption will avoid the loss of life now caused by the defects of the present system which traverses the streets of our cities.

The grounding of incased overhead conductors may be effectually and economically effected by the direct clamping of the casings to metallic poles, thereby effecting a permanent and effectual ground, and the casings may also be clamped directly to the same poles which carry metallic sheathed cables of other systems of various potentials, whether the casings of these other systems are utilized to carry a portion of the current of said system or not. The grounding of these various systems together on the same poles and the bonding of the cable-casings together can in no way affect the potentials of the various systems and the interior conductors of the several cables can never be at greater differences of potential from the exterior casings than the potential impressed at the sources of their supply.

The above description has been confined principally to overhead construction of the well-known direct-current system of series-arc lighting. Our invention, however, is equally well adapted to underground systems of series-arc lighting, where at present two incased cables are placed in conduits, one for the outgoing and one for the return current, and the use of the same absolutely eliminates one of these cables by utilizing the exterior casing of one cable for the return-conductor, this casing being grounded, as in the overhead system, at all available points.

The exterior casing of the underground conductor may be in direct contact with the metallic sheathings of the other underground conductors, and where the metallic sheathings of one system are utilized for one conductor the placing of a grounded high-tension current in direct contact therewith will not in any way interfere with the working of either system, for the reason that both the casings of the low-tension system referred to and the casing of the high-tension system as herein described are at one and the same potential with the earth, and it will be seen, further, that the conductors incased by the several metallic sheathed cables cannot be of greater difference of potential from the earth than that impressed at the several sources of their supply.

While our improvements have been described as applicable to direct-current series-arc distribution, they apply equally well to series-arc distribution with alternating current, and, furthermore, our improved system as applied to alternating series-arc distribution has certain advantages which will be set forth in separate applications for patents on high-tension alternating distribution.

What we claim as new, and desire to secure by Letters Patent, is—

1. In a series-arc system of electrical distribution, a conductor, translating devices in series with said conductor and a metallic covering for said conductor insulated therefrom, made in sections electrically bonded at said translating devices and constituting the return-conductor.

2. In a series-arc system of electrical distribution, a generator having one side grounded, a conductor leading from the other side, translating devices in series with said conductor, and a metallic covering for said conductor, insulated therefrom, made in sections electrically bonded at said translating devices, grounded throughout the distribution and at the generator, and constituting the return-conductor.

In testimony whereof we have hereunto set our hands in presence of the subscribing witnesses.

WARREN B. REED.
LYMAN C. REED.

Witnesses to signature of Warren B. Reed:
HARRY A. WALTERS,
ABRAHAM GOLDBERG.
Witnesses to signature of Lyman C. Reed:
WM. M. STOCKBRIDGE,
GEO. W. REA.